United States Patent [19]

Bavard et al.

[11] Patent Number: 5,172,041
[45] Date of Patent: Dec. 15, 1992

[54] METHOD AND DEVICE FOR ASYNCHRONOUS ELECTRIC MOTOR CONTROL BY MAGNETIC FLUX REGULATION

[75] Inventors: Jean Bavard, Lyons; Liming Wei, Villeurbanne, both of France

[73] Assignee: GEC Alsthom SA, Paris, France

[21] Appl. No.: 739,032

[22] Filed: Aug. 1, 1991

[30] Foreign Application Priority Data

Aug. 1, 1990 [FR] France .................................. 90 09847

[51] Int. Cl.⁵ .............................................. H02P 5/40
[52] U.S. Cl. ...................................... 318/803; 318/805
[58] Field of Search ............... 318/808, 805, 803, 798, 318/807

[56] References Cited
U.S. PATENT DOCUMENTS

| | | | |
|---|---|---|---|
| 4,431,957 | 2/1984 | Chausse et al. | 318/805 |
| 4,470,000 | 9/1984 | Heinle | 318/805 |
| 4,677,360 | 6/1987 | Garces | 318/803 |

FOREIGN PATENT DOCUMENTS 0335180 10/1989 European Pat. Off. .

*Primary Examiner*—William M. Shoop, Jr.
*Assistant Examiner*—John W. Cabeca
*Attorney, Agent, or Firm*—Sughrue, Mion, Zinn, Macpeak & Seas

[57] ABSTRACT

A method is provided for asynchronous motor control by closed-loop variation of magnetic induction flux as a function of a desired value in which the closed-loop variation includes flux measurement on the basis of measurement of motor voltage and current and determination of a measured flux value obtained using said measurements and characteristic parameters of said motor in accordance with the motor operating equations, the method including the steps of obtaining the measured flux for an arbitrarily fixed value of at least one of said parameters wich may significantly differ from the actual value thereof and of then correcting the desired value in order to compensate for this possible difference.

10 Claims, 1 Drawing Sheet

METHOD AND DEVICE FOR ASYNCHRONOUS ELECTRIC MOTOR CONTROL BY MAGNETIC FLUX REGULATION

BACKGROUND OF THE INVENTION

The present invention relates to asynchronous motor control using magnetic induction flux regulation, such flux being able to be the stator, air gap, or rotor flux.

Asynchronous motor control achieved by flux variation under the control of a desired value thereof is known.

Such control requires measurement of the flux, for example the flux in the rotor, which to date is achieved either by providing additional turns on the rotor and then deducing the flux on the basis of the voltage observed at the terminals of the turns, or by measuring stator voltage and current and then deducing the flux from the measurements and from parameters that are characteristic of the motor, using equations that define the operation of the motor.

The first of these methods suffers from the disadvantage of, apart from the fact that practical problems arise in carrying it out, its lack of reliability because of the fact that the flux sensor, which is directly fitted into the motor, is subject to a relatively agressive environment, as regards temperature, humidity, pollution, vibrations, sudden shock, etc.

The second method suffers from the disadvantage that its reliability can be affected by variation in one at least of the said characteristic parameters of the motor, as a function of its thermal status, the parameter most likely to be affected being the stator resistance.

One way of avoiding this disadvantage is to fit a temperature sensor inside the motor but when this is done the same disadvantages as in the first of the above methods are again encountered.

The present invention sets out to provide a method and device for controlling an asynchronous motor by flux regulation that avoids the above disadvantages.

SUMMARY OF THE INVENTION

The invention provides a method for asynchronous motor control by closed-loop variation of magnetic induction flux as a function of a desired value, said closed-loop variation including flux measurement on the basis of measurement of motor voltage and current and determination of a measured flux value obtained using said measurements and characteristic parameters of the motor in accordance with the motor's operating equations. According to the invention, the measured flux is obtained for an arbitrarily fixed value of at least one of said parameters which may significantly differ from the actual value thereof and the desired value is corrected in order to compensate for the possible difference.

Other objects and features of the invention will become more clear from the examples that follows of several embodiments, in conjunction with the attached drawings.

DETAILED DESCRIPTION OF PREFERRED EMBODIMENTS

Figure 1:
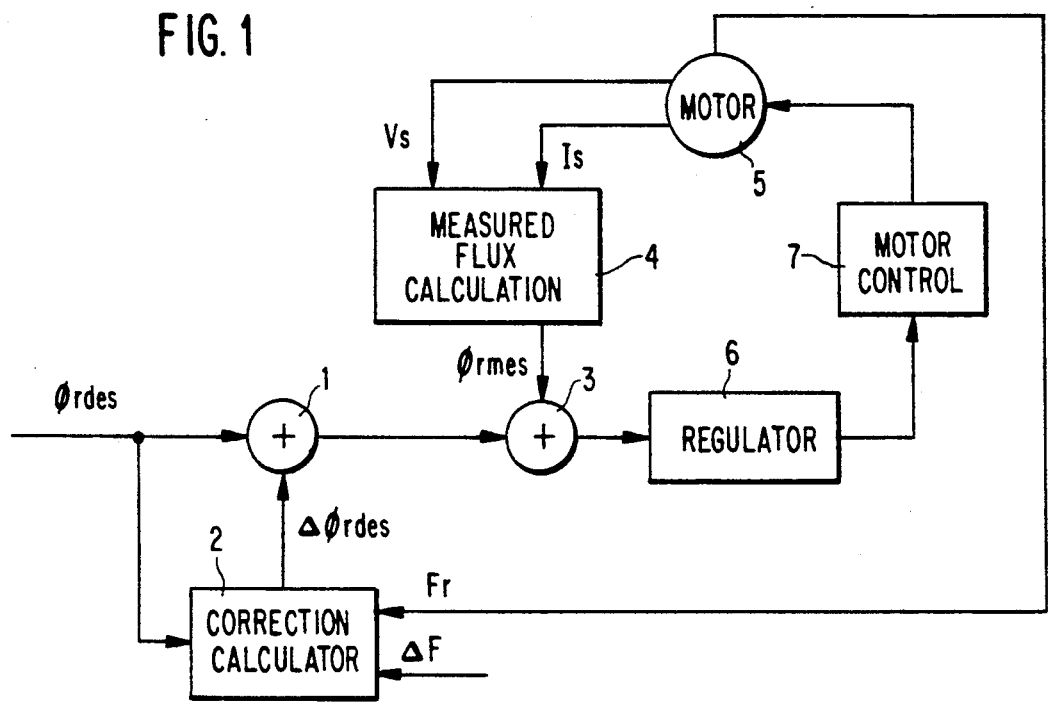
FIG. 1 is a block diagram of an asynchronous motor control device in which, by way of example, the rotor flux is subject to control using a desired value, in accordance with a first embodiment of the invention.

It will be recalled that the vector equation that defines the operation of an asynchronous motor and relates the stator current vector $I_S$ and the stator voltage vector $V_S$ with the actual rotor flux vector $\Phi r$ of a motor is as follows:

$$\overline{\Phi}_r = \frac{L_r}{L_m}(\int \overline{V}_S dt - \int R_S \overline{I}_S dt - \sigma L_S \overline{I}_S) \quad (1)$$

in which:

$L_r$ is the cyclic inductance of the rotor,
$L_m$ is the cyclic mutual inductance between stator and rotor,
$R_S$ is the motor's stator resistance per phase,
$L_S$ is the cyclic inductance of the stator,
$\sigma$ is the leakage factor, $$(\sigma = 1 - L_m^2/(L_r L_s))$$

This equation enables the rotor flux in the motor to be calculated using conventional means starting from a measurement of stator voltage and current, and knowing the value of the parameters $L_r$, $L_m$, $R_s$, $L_s$ and $\sigma$ that are characteristic for the motor.

We now define a flux, referred to as the measured flux $\Phi_{rmes}$ defined by:

$$\overline{\Phi}_{rmes} = \frac{L^*_r}{L^*_m}(\int \overline{V}_S dt - \int R_S^* \overline{I}_S dt - \sigma^* L_S^* \overline{I}_S) \quad (1')$$

in which the term $R_S^*$ stands for an arbitrarily fixed value of stator resistance which can notably differ from its actual value $R_S$.

The same symbol "*" has been employed for the parameters $L_r$, $L_m$, $L_S$ and $\sigma$ to indicate that these parameters also have a predetermined value which can differ from their actual value although, in this case, this predetermined value only varies slightly or in a determinable manner with respect to the said actual value during operation of the motor.

This measured flux is used for providing comparison with the rotor flux desired value $\Phi_{rdes}$, the latter being corrected to compensate for the error due to the difference between the values $R_s$ and $R_s^*$.

In accordance with the first embodiment of the invention, illustrated in FIG. 1, the value $R_s^*$ is selected to be zero and correction of the rotor flux desired value $\Phi_{rdes}$ is provided by adding a correction term $\Delta\Phi_{Rdes}$, obtained as below, to the desired value.

As the value of $R_s^*$ is zero, equation (1') giving the measured rotor flux $\Phi_{rmes}$ can now be written:

$$\overline{\Phi}_{rmes} = \frac{L^*_r}{L^*_m}(\int \overline{V}_S dt - \sigma L_S \overline{I}_S) \quad (2)$$

At a reference point that is linked to the measured rotor flux $\Phi_{rmes}$, the latter equation can be written as:

$$\Phi_{rmes} = \frac{L^*_r}{L^*_m} \left( \frac{V_{sq}}{w_S} - \sigma L_S I_{Sd} \right) \quad (3)$$

in which $I_{Sd}$ and $V_{sq}$ respectively stand for the component of stator current $I_S$ along the direct axis of this reference point and the component of the stator voltage $V_s$ along the quadrature axis, and $w_s$ stands for the angular frequency of the stator supply.

As the vectors $\Phi_{rmes}$ (measured rotor flux) and $\Phi_r$ (actual rotor flux) only exhibit slight angular deviation, $V_{sq}$ and $I_{Sd}$ can be replaced by their expression as a function of the actual flux $\phi_r$ at a reference point linked to this actual rotor flux, these expressions being taken from the equations that cover the operation of the motor, and being written under steady running as:

$$V_{sq} = w_S \Phi_r \left( \frac{L_S}{L_m} + g \frac{R_S}{R_R} \frac{L_R}{L_m} \right) \quad (4)$$

$$I_{sd} = \frac{\Phi_r}{L_m} \quad (5)$$

in which "g" designates the motor slip.

We now obtain:

$$\Phi_{rmes} \simeq \frac{L_R^*}{L_m^*} \frac{L_S}{L_m} \Phi_r + \frac{L_R^*}{L_m^*} g \frac{R_S}{R_R} \frac{L_R}{L_m} \Phi_r - \sigma^* L_S^* \frac{L_R^*}{L_m^*} \frac{\Phi_r}{L_m} \quad (6)$$

or, if we consider that the values $L_r^*$, $L_m^*$, $L_s^*$ and $\sigma^*$ are approximately equal to the respective values $L_r$, $L_m$, $L_s$ and $\sigma$:

$$\Phi_{rmes} \simeq \Phi_r \left( \frac{L_r L_S}{L_m^2} (1 - \sigma) + \frac{R_S}{R_R} \frac{L_R^2}{L_m^2} \right) \quad (7)$$

or again, if we consider that:

$$\sigma = 1 - \frac{L_m^2}{L_R L_S} \quad (8)$$

$$\Phi_{rmes} \simeq \Phi_r \left( 1 + g \frac{R_S}{R_R} \frac{L_R^2}{L_m^2} \right)$$

As closed-loop control ensures:

$$\Phi_{rmes} = \Phi_{rdes} \Delta \Phi_{rdes}$$

in order to obtain $\Phi_r = \Phi_{rdes}$, it is necessary that:

$$\Delta \Phi_{rdes} = \Phi_{rdes} \cdot g \frac{R_S}{R_R} \frac{L_R^2}{L_m^2} \quad (9)$$

It will be noted that in this expression stator resistance $R_S$ occurs in relation with rotor resistance $R_R$. As these two resistances vary in the same manner during operation of the motor, this ratio is practically constant whatever the motor's operating point, and can be replaced by a constant "k" which is only a function of the type of motor. This gives:

$$\Delta \Phi_{rdes} = k \cdot g \cdot \Phi_{rdes} \quad (10)$$

Moreover, a deviation in the actual ratio of the resistances from the ratio given by constant "k" as chosen will have only a very slight effect on the motor's torque.

It will be further noted that as slip "g" tends towards zero when motor rotation speed increases, this means that the value $\Delta \Phi_{rdes}$ also tends to zero and correction of the desired value tends to no longer become necessary. Correction of the desired value is however essential at low motor speed.

In FIG. 1 reference numeral 1 stands for an adding circuit that adds the correction term $\Delta \Phi_{rdes}$ to the desired value $\Phi_{rdes}$, the correction term being provided by a conventional calculating means 2 that calculates this correction term $\Delta \Phi_{rdes}$ using formula (10) above starting from the desired value $\Phi_{rdes}$ and from the values $F_r$ and $\Delta F$ needed to calculate slip "g", the latter being in fact expressed in the form:

$$g = \frac{F}{F_r + \Delta F}$$

in which $F_r$ stands for the mechanical frequency reduced to an electrical frequency, and $\Delta F$ is the difference between stator frequency and $F_r$.

The value $F_r$ is for example measured, and the value $\Delta F$ obtained using conventional calculating means which will not be described here.

The corrected desired value obtained at the output from adding circuit 1 is applied to a detector 3 for determining the deviation between the corrected desired value and the measured rotor flux value $\Phi_{rmes}$, the latter being obtained using calculating means 4 using the values measured for stator voltage $V_S$ and stator $I_S$ of the motor indicated by reference numeral 5.

The calculating means 4 are conventional calculating means which will not be described here, it being sufficient to mention that they operate here with a value $R_s^*$ of zero.

In a conventional manner, the signal leaving deviation detector 3 is then applied to a regulating means 6 before applying it to a motor control unit 7 which is also conventional.

Figure 2:
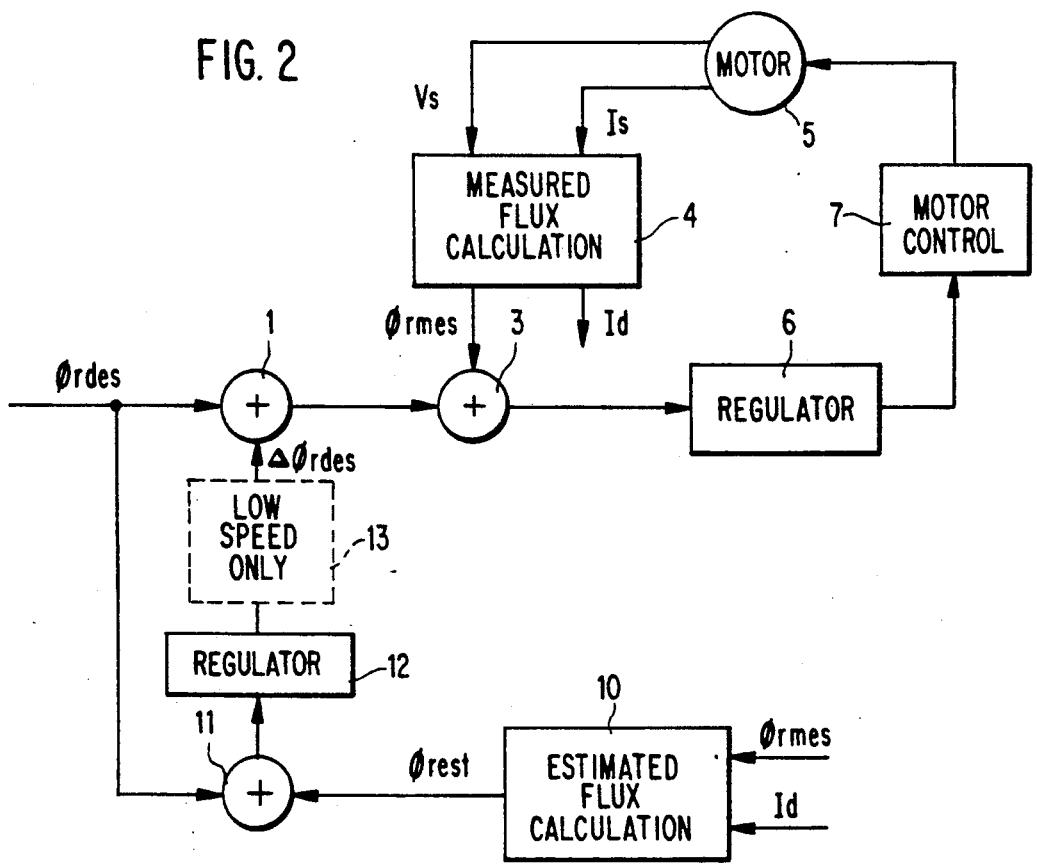
FIG. 2 is a block diagram of an asynchronous motor control device in which, by way of example, the rotor flux is subject to control using a desired value, in accordance with a second embodiment of the invention.

In accordance with the second embodiment of the invention illustrated in FIG. 2 in which identical parts carry the reference numerals as in FIG. 1, the arbitrary value $R_s^*$ of stator resistance can be selected to be zero or non-zero, and the correction of rotor flux desired value $\Phi_{rdes}$ is obtained by adding a correction term $\Phi_{rdes}$ obtained as below, to this desired value.

Calculating means 10 calculate a rotor flux which we shall call estimated rotor flux $\Phi_{rest}$, which can be identified with the actual rotor flux $\Phi_r$ of the motor, starting from measured rotor flux $\Phi_{rmes}$, using a formula for example obtained in the following manner.

In equation (1'), $V_s$ is replaced by its expression given by equation (1).

We obtain:

$$\overline{\Phi}_{rmes} = \frac{L^*_r}{L^*_m} \left( \int \Delta R_S \overline{I_S} dt + \Delta \sigma L_S \overline{I_S} + \frac{L_m}{L_r} \overline{\Phi}_r \right) \quad (3')$$

in which $$\Delta R_s = R_s - R_s^*$$

$$\Delta \sigma L_s = \sigma L_s - \sigma^* L_s^*$$

giving, under steady operating conditions:

$$\overline{\Phi}_{rmes} = \frac{L^*_r}{L^*_m}\left(-\frac{\Delta R_S}{W_S}j\overline{I_S} + \Delta\sigma L_S \overline{I_S} + \frac{L_m}{L_r}\overline{\Phi}_r\right) \quad (4')$$

By carrying out a scalar multiplication by $I_s$, the term $$-\frac{\Delta R_S}{W_S}j\overline{I_S}$$

can be made to disappear and we obtain:

$$\overline{\Phi}_{rmes} \cdot \overline{I_S} = \frac{L^*_r}{L^*_m}\left(\Delta\sigma L_S I_S^2 + \frac{L_m}{L_r}\overline{\Phi}_r \cdot \overline{I_S}\right) \quad (5')$$

Let $I_d$ and $I_m$ be respectively the components of $I_S$ along the direct axis of reference points respectively linked to measured rotor flux $\Phi_{rmes}$ and actual rotor flux $\Phi_r$.

It is known, from the motor operating equations, that at a reference point that is linked to actual rotor flux, the component $I_m$ is expressed in the following manner:

$$I_m = \frac{(1 + T_r p)\Phi_r}{L_m} \quad (6')$$

in which p designates the Laplace differential operator and $T_r$ is the rotor time constant, where $$T_r = \frac{L_r}{R_r}$$

Equation (5') can now be written:

$$\Phi_{rmes} \cdot I_d = \frac{L_r^*}{L_m^*}\left(\Delta\sigma L_S I_S^2 + \frac{(1 + T_r p)\Phi_r^2}{L_r}\right) \quad (7')$$

giving:

$$\Phi_r = \sqrt{\frac{\left(\Phi_{rmes} \cdot I_d - \frac{L_r^*}{L_m^*}\Delta\sigma L_S I_S^2\right)L_m^* L_r}{L_r^*(1 + T_r p)}} \quad (8')$$

Taking account of the fact that $\Delta\sigma L_s$ is approximately equal to zero, and that $L_r^*$ is approximately equal to $L_r$ and $L_m^*$ is approximately equal to $L_m$, an estimated rotor flux $\Phi_{rest}$ is obtained which is close to the actual flux $\Phi_r$, and is defined by the expression:

$$\Phi_{rest} = \sqrt{\frac{\Phi_{mes} \cdot I_d \cdot L_m}{1 + T_r p}} \quad (9')$$

this being an expression in which only measured flux $\Phi_{rmes}$, parameters $L_m$ and $T_r$ that are characteristic of the motor and measured stator current (through its component at a reference point linked to measured flux $\Phi_{rmes}$) occur.

The calculating means 10 hence receives the measured rotor flux $\Phi_{rmes}$ at its input as well as the direct component of stator current $I_S$ at a reference point linked to this measured rotor flux.

A deviation detector 11 determines the difference between estimated rotor flux $\Phi_{rest}$ and the rotor flux desired value $\Phi_{rdes}$, this deviation then being applied to a regulation means 12 which reduces this deviation or difference to zero.

It will be noted, in relation with the embodiment that has just been described, that estimated flux could be obtained from a flux estimating system that is different from the one described above by way of example, and that desired value correction makes it possible, in this example, to avoid the difficulties that could come about from direct deviation detection between the desired value and this estimated flux.

In order to carry out desired value correction at low motor speeds and only up to a determined mechanical frequency value $F_{ro}$, the regulating means 12 can be followed by a means making it possible to render application of correction term $\Delta\Phi_{rdes}$ to the adding circuit 1 effective only within the considered speed range.

In the example in FIG. 1, this latter means would be integrated into the calculating means 2.

The method for asynchronous motor control by flux regulation that has just been described thus makes it possible to obtain a good degree of accuracy without suffering from the practical difficulties in carrying it out that are encountered in the prior art.

It will be noted that as the amplitude of the stator, air gap and rotor flux are very close, the same principles of correction can be employed whatever type of flux is employed for regulation.

What is claimed is:

1. A method of controlling an asynchronous electric motor by varying a magnetic flux associated with operation of said motor, said motor having operating equations characterizing its operation and further having characteristic parameters associated with operation of said motor, said method comprising the steps of providing a control signal in accordance with a desired value of said flux, generating a feedback signal representing an actual value of said flux, comparing the control and feedback signals, and controlling the motor by varying said magnetic flux in accordance with results of said comparing step, wherein the step of generating said feedback signal includes the steps of:

measuring the motor voltage and current; and
calculating a measured flux, using the operating equations for said motor and employing said measured voltage and current values and predetermined values for said characteristic parameters of said motor, at least one of said predetermined values being fixed at an arbitrary value which may differ considerably from the actual value of the corresponding characteristic parameter of said motor; and wherein said step of providing said control signal includes the steps of:

providing a first signal representing said desired value; and
correcting said first signal in order to compensate for the possible difference between said arbitrary value and said actual value.

2. A method according to claim 1, wherein said step of varying said magnetic induction flux comprises regulating the rotor flux of said motor, and wherein said step of measuring said motor voltage and current comprises measuring the stator voltage and current of said motor, and wherein said corresponding characteristic parameter is the stator resistance of said motor.

3. A method according to claim 1, wherein said arbitrarily fixed value is selected to be zero and said desired value of said flux $\Phi_{des}$ is corrected by adding a correction term $\Delta\Phi_{des}$ defined by:

$$\Delta\Phi_{des} = k\, g\, \Phi_{des}$$

where q is a motor slip and k is a constant that is a function of said motor.

4. A method according to claim 1, wherein said step of correcting said first signal comprises calculating an estimated flux value related to the actual flux value, detecting a difference between said first signal and said estimated flux value to obtain a correction term, and adding said correction term to said first signal.

5. A method according to claim 4, wherein said step of calculating said estimated flux value comprises calculating said estimated flux value in accordance with said measured flux by employing an expression deduced from said operating equations as a function of said measured flux, and from characteristic parameters of said motor other than said at least one parameter, and from said voltage or current measurements.

6. A method according to claim 5, wherein said estimated flux $\Phi_{est}$ is given by the expression;

$$\Phi_{est} = \sqrt{\frac{L_m \cdot \Phi_{mes} \cdot I_d}{1 + T_r p}}$$

where $\Phi_{mes}$ is the measured flux, $I_d$ is a direct component thereof at a reference point linked to said measured flux, $L_m$ is a cyclic mutual inductance of a stator of said motor with respect to a rotor thereof, and $T_r$ is a time constant of the rotor.

7. A device for controlling an asynchronous electric motor by varying a magnetic flux associated with operation of said motor, said motor having operating equations characterizing its operation and further having characteristic parameters associated with operation of said motor, said device including means for providing a control signal in accordance with a desired value of said flux, means for generating a feedback signal representing an actual value of said flux, means for comparing the control and feedback signals, and means for varying said magnetic flux in accordance with results of said comparing step, wherein said means for generating said feedback signal comprises:

means for measuring the motor voltage and current; and means for calculating a measured flux, using the operating equations for said motor and employing said measured voltage and current values and predetermined values for characteristic parameters of said motor, at least one of said predetermined values being fixed at an arbitrary value which may differ considerably from the actual value of the corresponding characteristic parameter of said motor; and wherein said means for providing said control signal comprises:

means for providing a first signal representing said desired value; and means for correcting said first signal in order to compensate for the possible difference between said arbitrary value and said actual value.

8. A device according to claim 7, wherein said arbitrarily fixed value is selected to be zero, said means for correcting said first signal comprises means for calculating a correction term $\Delta\Phi_{des}$ defined by:

$$\Delta\Phi_{des} k\, g\, \Phi_{des}$$

where k is a constant that is a function of said motor, g is a motor slip and $\Phi_{des}$ is said first signal, and means for adding said correction term to said first signal.

9. A device according to claim 7, wherein said means for correcting said first signal comprises means for calculating and estimated flux value related to the actual flux value, means for detecting a difference between said first signal and said estimated flux to obtain a correction term, and means for adding said correction term to said first signal to obtain said control signal, wherein said means for calculating said estimated flux value comprises means for calculating said estimated flux value in accordance with said measured flux by employing an expression deduced from said operating equations as a function of said measured flux, and from characteristic parameters of said motor other than said at least one parameter, and from said voltage or current measurements.

10. A device according to claim 9, wherein the estimated flux $\Phi_{est}$ is given by the expression:

$$\Phi_{est} = \sqrt{\frac{L_m \cdot \Phi_{mes} \cdot I_d}{1 + T_r p}}$$

where $\Phi_{mes}$ is the measured flux, $I_d$ is a direct component thereof at a reference point linked to said measured flux, $L_m$ is a cyclic mutual inductance of a stator of said motor with respect to a rotor thereof, and $T_r$ is a time constant of the rotor.

* * * * *